(12) United States Patent
Matsuda et al.

(10) Patent No.: US 8,077,349 B2
(45) Date of Patent: Dec. 13, 2011

(54) IMAGE PROCESSING APPARATUS AND COMPUTER READABLE MEDIUM STORING IMAGE PROCESSING PROGRAM

(75) Inventors: Yoichi Matsuda, Saitama (JP); Hideo Kakizawa, Nagano (JP)

(73) Assignee: Fuji Xerox Co., Ltd, Tokyo (JP)

( * ) Notice: Subject to any disclaimer, the term of this patent is extended or adjusted under 35 U.S.C. 154(b) by 778 days.

(21) Appl. No.: 11/729,872

(22) Filed: Mar. 30, 2007

(65) Prior Publication Data

US 2007/0285690 A1    Dec. 13, 2007

(30) Foreign Application Priority Data

Jun. 12, 2006  (JP) ................ P2006-161847

(51) Int. Cl.
*G06F 15/00* (2006.01)
(52) U.S. Cl. .......... 358/1.9; 358/449; 347/131; 347/251
(58) Field of Classification Search .................. 358/1.9, 358/449; 347/131, 251
See application file for complete search history.

(56) References Cited

U.S. PATENT DOCUMENTS

| | | | | |
|---|---|---|---|---|
| 5,517,227 A | * | 5/1996 | Atsumi et al. | 347/131 |
| 5,999,275 A | * | 12/1999 | Hagihara | 358/449 |
| 6,005,683 A | | 12/1999 | Son et al. | |
| 6,433,896 B1 | | 8/2002 | Ueda et al. | |
| 2005/0226510 A1 | | 10/2005 | Eguchi et al. | |
| 2006/0279597 A1 | * | 12/2006 | Ishimoto et al. | 347/16 |

FOREIGN PATENT DOCUMENTS

| | | |
|---|---|---|
| JP | 3-93348 A | 4/1991 |
| JP | 08-204912 A | 8/1996 |
| JP | 09-027909 A | 1/1997 |
| JP | 10-145556 A | 5/1998 |
| JP | 11-177773 A | 7/1999 |
| JP | 11-205606 A | 7/1999 |
| JP | 2001-268367 A | 9/2001 |
| JP | 2001-285585 A | 10/2001 |
| JP | 2004-254166 A | 9/2004 |
| JP | 2005-285010 A | 10/2005 |

OTHER PUBLICATIONS

Office Action issued in counterpart Japanese Application No. 2006-161847 dated Nov. 9, 2010.

* cited by examiner

*Primary Examiner* — Twyler Haskins
*Assistant Examiner* — Michael Burleson
(74) *Attorney, Agent, or Firm* — Sughrue Mion, PLLC

(57) ABSTRACT

An image processing apparatus includes an image data input unit, a density variation detection unit and a position/size detection unit. The image data input unit inputs image data containing original image data obtained by reading an original. The density variation detection unit detects density variation from the image data input through the image data input unit. The position/size detection unit detects a position or a size of the original image data in the image data based on the density variation detected by the density variation detection unit.

9 Claims, 12 Drawing Sheets

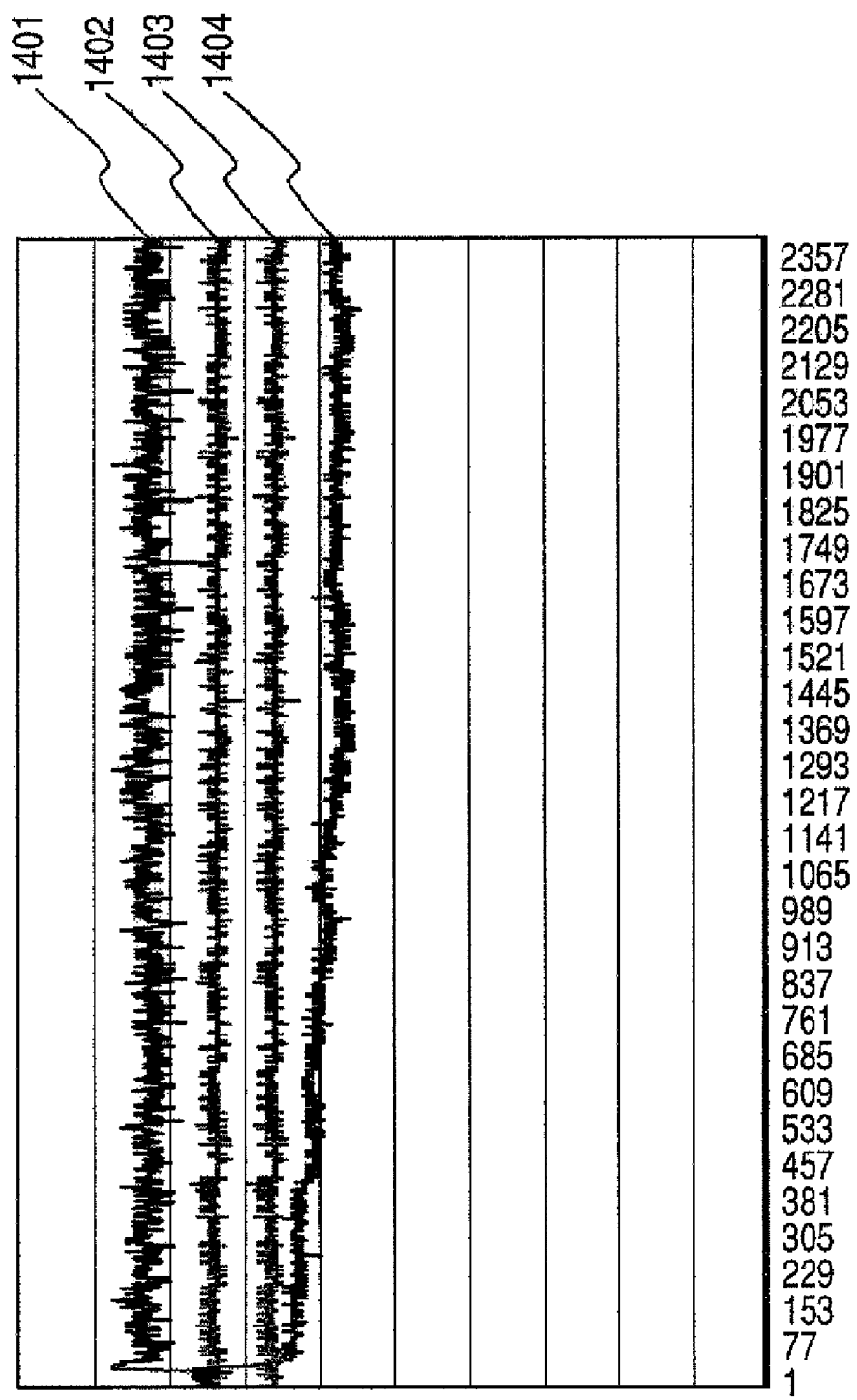

IMAGE PROCESSING APPARATUS AND COMPUTER READABLE MEDIUM STORING IMAGE PROCESSING PROGRAM

CROSS-REFERENCE TO RELATED APPLICATIONS

This application is based on and claims priority under 35 U.S.C. §119 from Japanese Patent Application No. 2006-161847 filed Jun. 12, 2006.

BACKGROUND

Technical Field

The invention relates to an image processing apparatus and a computer readable medium storing an image processing program.

SUMMARY

According to an aspect of the invention, an image processing apparatus includes an image data input unit, a density variation detection unit and a position/size detection unit. The image data input unit inputs image data containing original image data obtained by reading an original. The density variation detection unit detects density variation from the image data input through the image data input unit. The position/size detection unit detects a position or a size of the original image data in the image data based on the density variation detected by the density variation detection unit.

BRIEF DESCRIPTION OF THE DRAWINGS

Exemplary embodiments of the invention will be described below with reference to the accompanying drawings wherein:

FIG. 15 is a graph of the density data of the image in the sub-scanning direction.

DETAILED DESCRIPTION

To begin with, an outline of an exemplary embodiment of the invention will be described.

This exemplary embodiment measures a width of an original and positions on an original-conveying-type fixed image sensor through which the original passes with good accuracy based on image data obtained by the image sensor without using a sensor dedicated to detect the width of the original.

This exemplary embodiment reads the original, acquires a difference in density variation of each pixel or each group of plural pixels in a sub-scanning direction at first plural lines and/or last plural lines of the read image data, and determines pixels having a large difference in the density variation as pixels through which the original passes. That is, this exemplary embodiment acquires a difference in the density variation in order from the left and right end pixels in a main scanning direction to inner pixels, detects pixels, which are determined as pixels where the original first passes through, as pixels where the right and left ends of the original pass, and acquires positions on the image sensor through which the original passes and a width of the original.

In the configuration where a fixed image sensor and a fixed platen plate are used, when reading the platen plate, the image sensor always reads the same position on the platen plate. Therefore, the read density in the sub-scanning direction scarcely changes in read pixel units. In this connection, even if the platen plate is dirty, dusty or scratched, variations in the read density in the sub-scanning direction are also stable.

Figure 14:
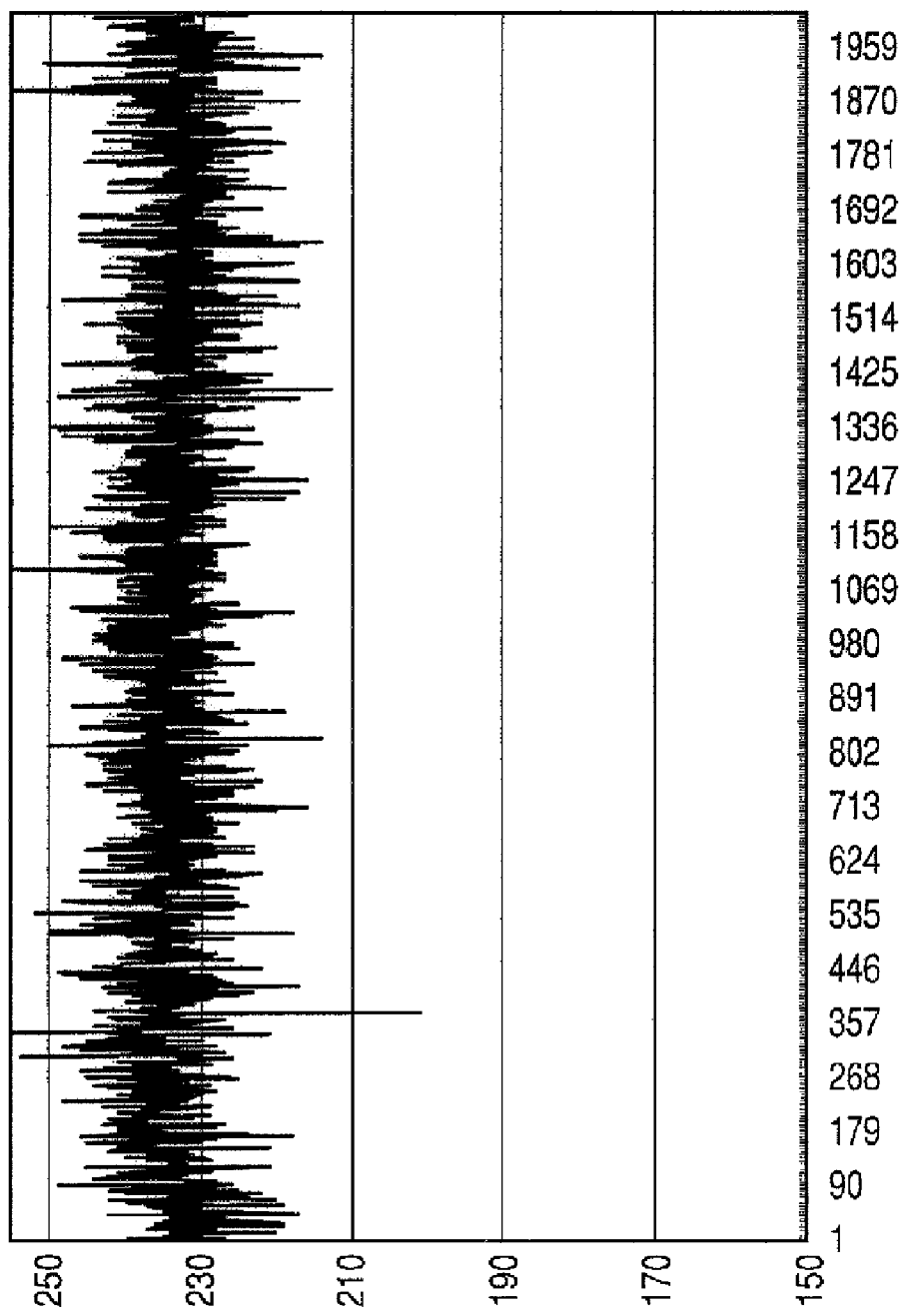
FIG. 14 is a graph of density data of an image in a sub-scanning direction.

For example, FIG. 14 represents density change at a right end of an original in image data obtained by reading the original (ordinary paper). X axis of the graph in FIG. 14 indicates positions in the sub-scanning direction, and Y axis indicates densities. It is seen from FIG. 14 that there is a certain band where density varies. Like FIG. 14, FIG. 15 represents density change at four positions in image data obtained by reading an original. The four are density change in the original 1401, density change in the platen plate 1402, density change at a dirty position of the platen plate 1403, and density change at a left end of the original 1404. As seen in FIG. 15, the density change in the platen plate 1402 and the density change at the dirty position of the platen plate 1403 are comparatively stable. On the other hand, the density change in the original 1401 and the density change at the left end of the original 1404 comparatively vary.

Next, to convey the original above a fixed image sensor as in this exemplary embodiment, space is provided between the top and the bottom of an original conveyance passage and a predetermined gap exists between the glass surface of the image sensor and the platen plate so as to allow a thick original to pass through and prevent damage to the original. In such a configuration, when a thick original is conveyed, a distance occurs between the surface of the original and the platen plate, whereby a shadow occurs in front, back, left, and right end parts of the original. If a thin original is conveyed, since a gap is produced between the platen plate and the original surface, the original becomes floppy, a shadow occurs in front, back, left, and right end parts of the original, and the read density of the original portion varies. The original read density during conveying of the original also varies due to fibers forming the original, a paper wrinkle of the original, or the like.

Accordingly, the read density in the original in the sub-scanning direction during conveying of the original largely varies as compared with the read density when a pixel or a group of pixels always reads the same position of the platen plate.

By utilizing a difference between a variation amount in read density of the original during conveying of the original and that in read density of the platen plate, this exemplary embodiment acquires a variation amount in density of each pixel or each group of plural pixels in the sub-scanning direction from plural lines containing a line at which an original is read, determines that pixels having a large variation amount in density are pixels through which the original passes pixels in order from the left and right end pixels in the main scanning direction to inner pixels, detects the pixels, which are first determined as pixels through which the original passes, as pixels through which the left and right ends of the original passes, and acquires position of the image sensor through which the original passes and a width of the original.

The exemplary embodiment performs the above processing at different timings during conveying of the original. As a result, the exemplary embodiment can acquire positions on the image sensor through which the original passes at the respective detection-process timings. Therefore, the exemplary embodiment can calculate a skew amount of the original based on the acquired positions through which the original passes.

Referring now to the accompanying drawings, the exemplary embodiments of the invention will be described in more detail.

Figure 1:
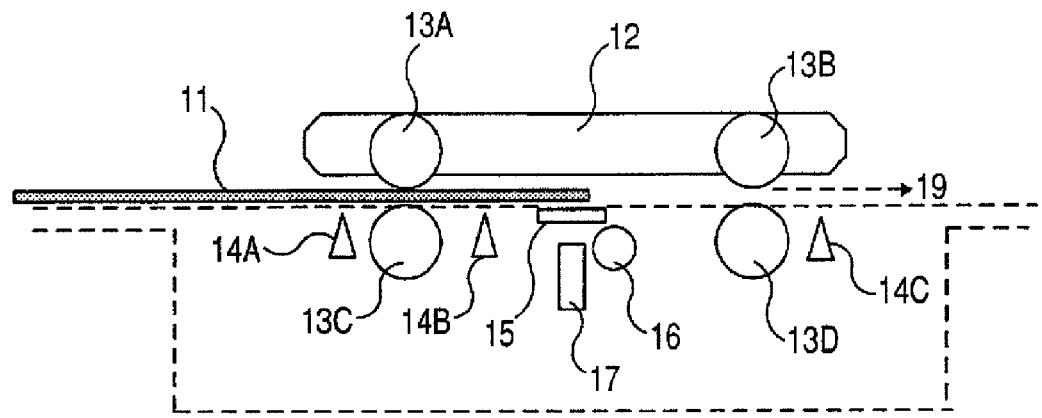
FIG. 1 is a schematic view to schematically show a structure example of a reading device.
Figure 2:
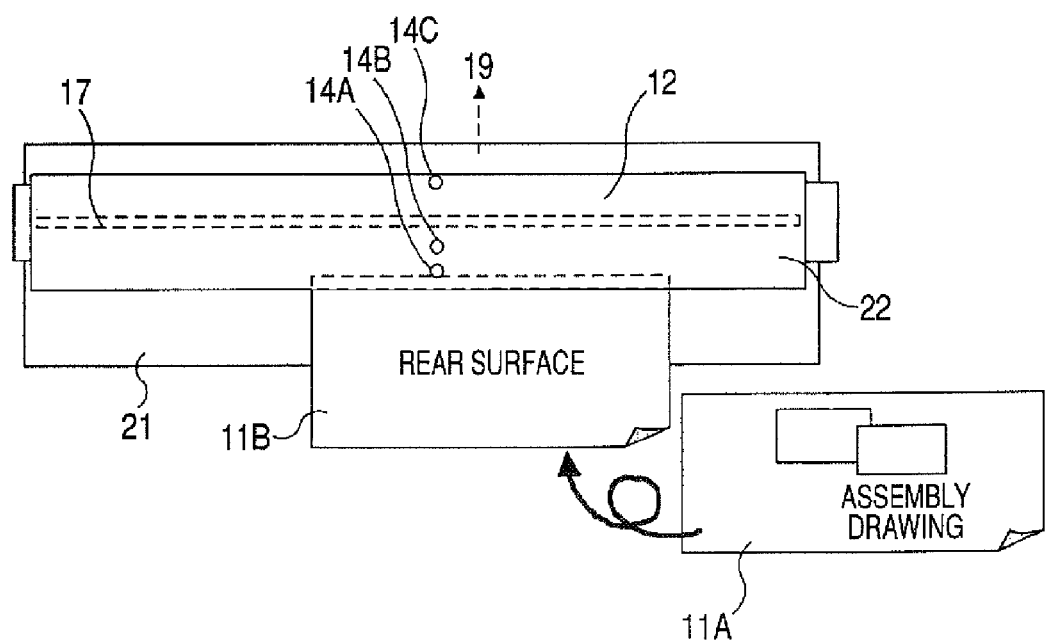
FIG. 2 is a schematic view to schematically show the structure example of the reading device.

The structure example of a reading device (scanner) will be described with FIGS. 1 and 2. FIG. 1 is a sectional view of the reading device. FIG. 2 is a top view of the reading device.

The reading device of the exemplary embodiment conveys an original and reads the original. The reading device has a fixed image sensor. In other words, the reading device of this exemplary embodiment is not a reading device for fixing an original and moving an image sensor to read the original.

As shown in FIGS. 1 and 2, the original 11 is inserted from an original insertion slot (from the left in FIG. 1, from the bottom in FIG. 2). A lamp 16 applies light to an original surface (the lower face of the original 11 in FIG. 1, the original (surface) 11A in FIG. 2). A fixed image sensor 17 reads reflected light as an image. The image sensor 17 has such a length so as to be able to read the full width of the original 11. The image sensor 17 may read the original one line by one line or may read the original plural lines by plural lines.

The top of the image sensor 17 is covered with glass 15 so as to prevent the image sensor from becoming dusty and being scratched. A platen plate 12 for holding the original 11 is placed above the glass 15. The original 11 passes between the glass 15 and the platen plate 12. The original 11 is inserted with the read surface (front surface) oriented to the glass 15. An original conveyance direction 19 extends from the original insertion slot through the glass 15 to an original ejection slot (from left to right in FIG. 1, and from bottom to top in FIG. 2).

To automatically convey the original 11, the reading device includes an original detection sensor 14A for detecting insertion of the original 11, an original detection sensor 14B for detecting the leading end/trailing end of the original 11, and an original detection sensor 14C for detecting passage of the trailing end of the original 11. In this case, the original detection sensor 14A, the original detection sensor 14B, and the original detection sensor 14C are disposed at the center in the main scanning direction of the original 11. However, the original detection sensors 14A to 14C may be disposed at any desired positions. Also, plural sensors may be disposed as each of the sensors 14A to 14C.

Rollers (rollers 13A, 13B, 13C, and 13D) are connected to a driving device 22 in FIG. 2, which includes a motor. Driving of the rollers 13A to 13D are controlled in accordance with the detected state of the original 11.

A relation between the image sensor 17 and the platen plate 12 may be opposite in the up and down direction. In this case, the original 11 is inserted with the read surface directing upward. The relation between the image sensor 17 and the platen plate 12 not only may be the up and down arrangement, but also may be the left and right arrangement. In the latter case, the read surface of the original 11 is directed to the image sensor 17.

The original 11 includes a document, such as a sheet of paper, which is to be input as image data. The original 11 is not limited to the sheet of paper but may be a sheet-like medium.

Also, a "size" of the original 11 includes only the longitudinal length of the original 11, only the lateral length of the original 11 (i.e., a width of the original 11) as well as both the longitudinal and lateral lengths of the original 11.

Figure 3:
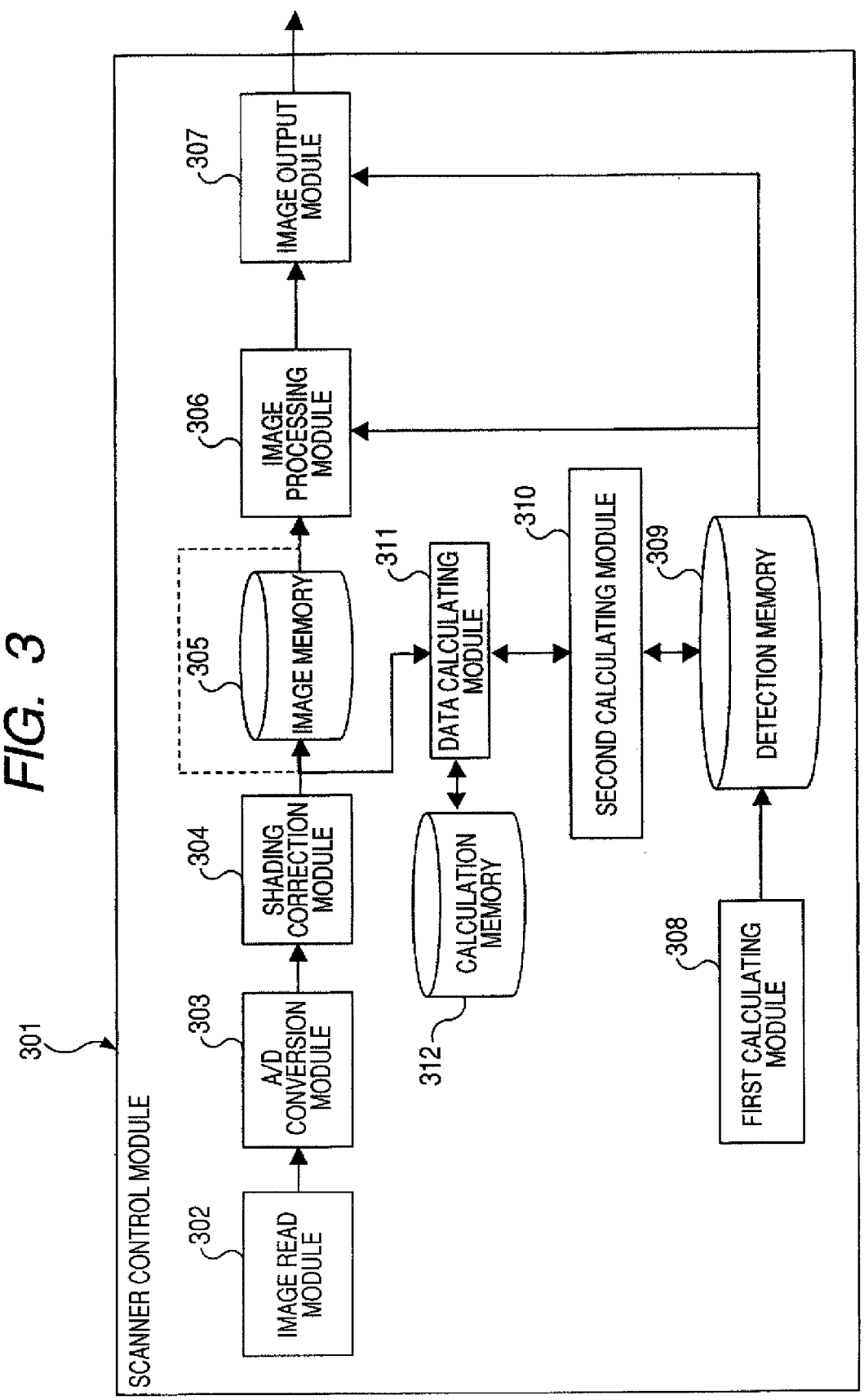
FIG. 3 is a block diagram to show the conceptual module configuration of an image processing apparatus.

FIG. 3 shows the conceptual module configuration example of the exemplary embodiment of the invention. The modules described with reference to FIG. 3 are incorporated into the reading device described with reference to FIGS. 1 and 2 and are implemented as a program for operating a computer or a hardware.

The module refers to a generally and logically detachable part of software, hardware, etc. The module of the exemplary embodiment means not only a module in a program, but also a module in the hardware configuration (ASIC, etc.). Therefore, the exemplary embodiment also serves as the description of a program, an apparatus and a method. Modules are almost in a one-to-one correspondence with functions; however, in implementation, one module may be one program or two or more modules may make up one program or two or more programs may make up one module. Two or more modules may be executed by one computer or one module may be executed in two or more computers in a distributed or parallel environment. In the description to follow, the term "connection" contains not only physical connection, but also logical connection.

The apparatus is not only provided as it is housed in one cabinet, but also implemented by connecting a plurality of hardware units, apparatus, etc., through a network, etc.

As shown in FIG. 3, a scanner control module 301 includes an image reading module 302, an A/D conversion module 303, a shading correction module 304, an image memory 305, an image processing module 306, an image output module 307, a first calculating module 308, a register 309 a second calculating module 310, a data calculating module 311 and a calculation memory 312.

The scanner control module 301 controls original detection executed by the original detection sensor 14A, the original detection sensor 14B and the original detection sensor 14C shown in FIG. 2, conveyance/stop of the original 11 executed by the driving device 22 and the operation of the whole apparatus. The scanner control module 301 also notifies as to whether or not the original 11 is detected and conveyance speed of each roller (the rollers 13A, 13B, 13C and 13D) to the first calculating module 308 in real time.

If the original detection sensor 14A detects insertion of the original 11, the image reading module 302 starts to read analog image values by the image sensor 17 before the leading end of the original 11 reaches the image sensor 17, and outputs the analog image values to the A/D conversion module 303.

The A/D conversion module 303 converts the analog image data output by the image reading module 302 into digital image data, and outputs the digital image data to the shading correction module 304.

The shading correction module 304 retains (i) white reference data, which is a density acquired by applying light of the lamp 16 to a uniform white reference plate and receiving the light reflected by the white reference plate before reading the original 11, and (ii) black reference data at the time when the lamp 16 is turned off. The shading correction module 304 adjusts variations of each pixel in the actually input digital image data.

The image memory 305 stores the image data corrected by the shading correction module 304. A capacity of the image memory 305 may be reduced depending on a process method of the second calculating module 310 and that of the data calculating module 311.

The image processing module 306 adjusts the image quality, the resolution, the size and the angle of the image data stored in the image memory 305. More particularly, for example, the image processing module 306 may perform image processing such as gamma correction, sharpness, gray level correction, image angle (rotation) correction, resolution conversion, scaling up and down, conversion of the number of tone levels, color adjustment and color conversion. To perform the image processing, the image processing module 306 may determine a image process method and parameters based on information stored in the register 309 (described later). For example, the image processing module 306 may determine a rotation angle of the image based on a positional relation among the leading end, the trailing end, the left position and the right position of the image. The image processing module 306 applies the image processing to the image data stored in the image memory 305. Alternatively, the image processing module 306 may apply the image processing directly to the image data corrected by the shading correction module 304.

The image output module 307 is connected to the image processing module 306 and the register 309. The image output module 307 has an interface function of sending the image data, the size information of the original (e.g., length and width of the original) to an external printer and/or an external host device.

The first calculating module 308 receives a notification as to whether or not the original is detected and the conveyance speed of the rollers in real time from the scanner control module 301, measures (calculates) positions of the original in the lengthwise direction of the original and the length of the original, and stores the calculation result in the register 309. The first calculating module 308 also stores information as to whether or not each of the leading end and trailing end of the original is detected.

The register 309 stores a state as to whether or not each original detection sensor (the original detection sensor 14A, the original detection sensor 14B and the original detection sensor 14C) detects an original; the positions of the original leading/trailing end of the original calculated by the first calculating module 308; the length of the original calculated by the first calculating module 308; plural sets of positions, corresponding to plural positions in the lengthwise direction, of the original in the widthwise direction of the original calculated by the second calculating module 310; and plural widths of the original calculated by the second calculating module 310.

The second calculating module 310 has a function of selecting one of plural calculation methods to detect positions of the original in the widthwise direction and the width of the original, and instructs the data calculating module 311 to calculate with the selected calculation method. The second calculating module 310 determines the positions of the original in the widthwise direction and the width of the original based on the result of the data calculating module 311 and the calculation memory 312, and stores the calculation result in the register 309. The second calculating module 310 can determine the positions of the original in the widthwise direction and the width of the original at any time after the original detection sensor 14A detects the original until the original detection sensor 14C detects the trailing end of the original. Not only the computation method of the data calculating module 311, but also the determination timing can be selected.

The data calculating module 311 performs computation processing described later using the image data from the image memory 305 or the image data directly from the shading correction module 304 according to the instruction from the second calculating module 310. The data required for the computation and the computation result are stored in the calculation memory 312.

Figure 4:
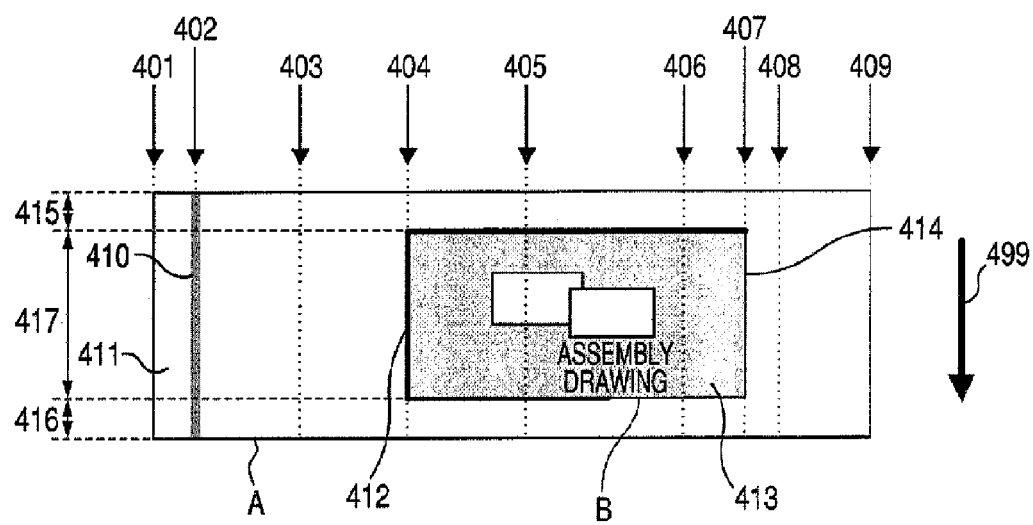
FIG. 4 is a schematic view to schematically show read image data.

Next, image data A acquired by the image sensor 17 and density variations in the sub-scanning direction 499 will be described with reference to FIG. 4. A length of the image data A in the main scanning direction (perpendicular to the sub-scanning direction 499) in FIG. 4 is the whole width of the image sensor 17 in the main scanning direction. In the sub-scanning direction 499, the image data A includes plural lines 415 acquired before the leading end of the original 11 reaches the image sensor 17, plural lines 416 after the trailing end of the original 11 reaches the image sensor 17 and lines 417 including original image data B. Therefore, the image data contains the original image data B acquired by reading the original 11. Pixel positions 401 to 409 indicated by arrows in FIG. 4 indicate positions of pixels in the main scanning direction. The pixel position 401 is a position of a pixel disposed at the leftmost end in the main scanning direction. The pixel position 409 is a position of a pixel disposed at the rightmost end in the main scanning direction.

The pixels disposed at the pixel positions 401, 402, 403, 408, and 409 are pixels where the original 11 does not pass above the image sensor 17 when the image data is acquired (although the original 11 is conveyed at that time), and always read the same positions on the platen plate 12. That is, those pixels output a read image 411 showing the platen plate 12 (image of a portion where no original exists) as shown in FIG. 4. The read densities of the pixels are almost constant values, and a variation amount of the read density is a small value as compared with pixels disposed at the pixel positions 404 to 407.

Here, it is assumed that the pixel disposed at the pixel position 402 reads a scratched or dirty part of the platen plate 12. Therefore, the scratch or dirt of the platen plate 12 causes a longitudinal stripe 410 to appear as shown in FIG. 4. A read density of this pixel is different from those of pixels for reading other parts of the platen plate 12 where no scratch or dirt occurs (for example, the pixel disposed at the pixel position 403). However, from the viewpoint of the variation amount of read density, the pixel disposed at the pixel position 402 always reads the same position of the platen plate 12, and thus the variation amount of this pixel in read density is a small value.

The pixels disposed at the pixel positions 404, 405, 406 and 407 are pixels where the original 11 passes above the image sensor 17 when the image data is acquired. Those pixels involve not only read densities when the same position of the platen plate 17 is read before and after passage of the original 11 (read densities acquired in the regions 415 and 416), but also read densities during the passage of the original 11 (a portion of a read image 413 of the original in FIG. 4).

The read densities during the passage of the original 11 vary sufficiently largely as compared with a variation amount, in read density, of the pixels which always read the same position of the platen plate 12 (the pixels disposed at the pixel positions 401, 402, 403, 408, and 409).

For example, in this exemplary embodiment, space is provided between the top and the bottom of the original conveyance passage and a predetermined gap is formed between the glass 15 of the image sensor 17 and the platen plate 12 to allow a thick original to pass through and prevent damage to the original, as shown in FIG. 1. Thus, when a thick original is conveyed, there is a gap between the surface of the original 11 and the platen plate 12, whereby a shadow occurs in front, back, left, and right end parts of the original 11. If a thin original is conveyed, since a gap is produced between the platen plate 12 and the surface of the original 11, the original 11 becomes floppy and a shadow occurs in front, back, left, and right end parts of the original 11. The case where the original margin shadow is dense 412 and the case where the original margin shadow is thin 414 may occur as shown in FIG. 4. The read density varies depending on the drawing on the original, and the original read density during conveying of the original varies due to fibers forming the original and a paper wrinkle of the original.

Thus, whether or not the original 11 passes above a certain pixel may be detected based on whether or not a variation amount of densities read by the pixel at the same pixel position in the sub-scanning direction is equal to or larger than a setup threshold value.

The second calculating module 310 may perform this detection process from the leftmost end pixel in the main scanning direction at the pixel position 401 and the rightmost end pixel in the main scanning direction at the pixel position 409 to inner pixels. When the second calculating module 310 first determines pixels above which the original 11 passes, the second calculating module 310 may detect such pixels as pixels above which the left and right ends of the original 11 pass. Thereby, the second calculating module 310 can obtain the positions where the original 11 passes above the image sensor 17. Also, the second calculating module 310 can calculate a width of the original 11 from the positions of the pixels above which the left and right ends of the original 11.

Next, with reference to FIGS. 5 and 6, a method for detecting a width of the original 11 and a method for calculating a skew amount will be described.

Figure 5:
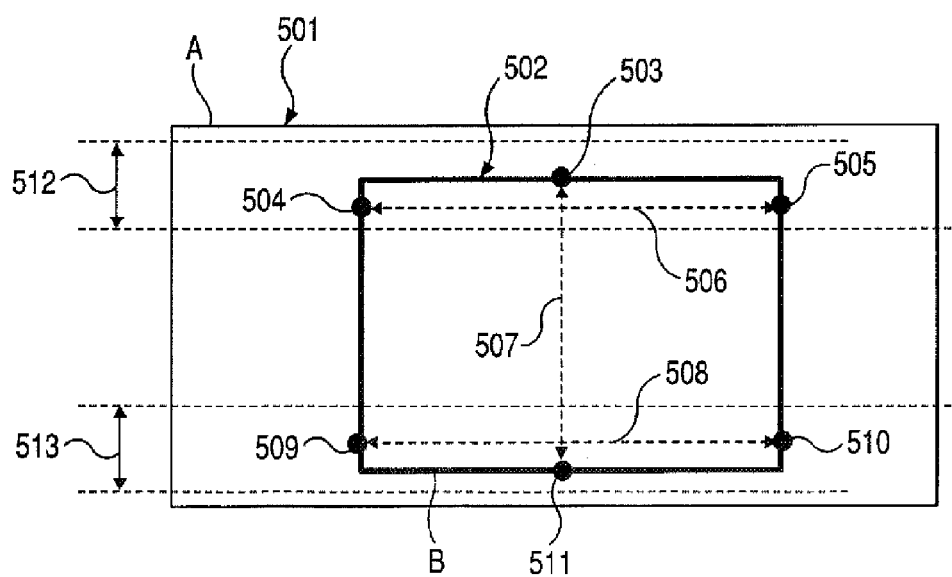
FIG. 5 is a schematic view to schematically show detection positions of an original.

FIG. 5 shows the entire acquired image data 501 (A) containing an original image 502 (B). FIG. 5 shows the image data 501 (A), which is acquired when the original 11 is inserted without inclination.

A "position of the original 11" is indicated by, for example, a leading end detection position 503 and a trailing end detection position 511, which are detected by the original detection sensor 14A, the original detection sensor 14B and the original detection sensor 14C and a leading end left position 504, a leading end right position 505, a trailing end left position 509, and a trailing end right position 510, which are detected by the second calculating module 310, the data calculating module 311 and the calculation memory 312. A distance between the leading end left position 504 and the leading end right position 505 is calculated to obtain a width 506 of the leading end portion. Also, a distance between the trailing end left position 509 and the trailing end right position 510 is calculated to obtain a width 508 of the trailing end portion.

To detect the width of the original 11, read data of plural lines in the sub-scanning direction are required to calculate the variation amount of read density (in FIG. 5, a left and right position detection range (leading end portion) 512 and a left and right position detection range (trailing end portion) 513). The required number of lines should be set to the minimum number of lines sufficient to make it possible to detect a difference in the variation amount of the read density.

The reason is as follows. It is assumed that in the reading operation when the leading end of the original 11 does not enter in parallel with the image sensor 17 (namely, when a skew occurs), the number of lines to calculate the variation amount of read density (in FIG. 6, a left and right detection range (leading end portion) 609 and a left and right detection range (trailing end portion) 610) is set to a large number. In this case as shown in FIG. 6, since the original 11 is inserted with inclination (skew), the width of the original 11 calculated from the positions recognized as the left and right ends of the original 11 involves a large error as compared with the actual width of the original 11. Generally, since the reading operation is executed so that the original 11 is not inserted with inclination (skew), only read data of a necessary minimum number of lines containing the original leading end portion of the original 11 is used to detect the insertion position of the original 11 and the width of the original 11. Thereby, highly accurate information can be achieved.

Next, a method of detecting that the original 11 is inserted with inclination (skew) will be described.

Figure 6:
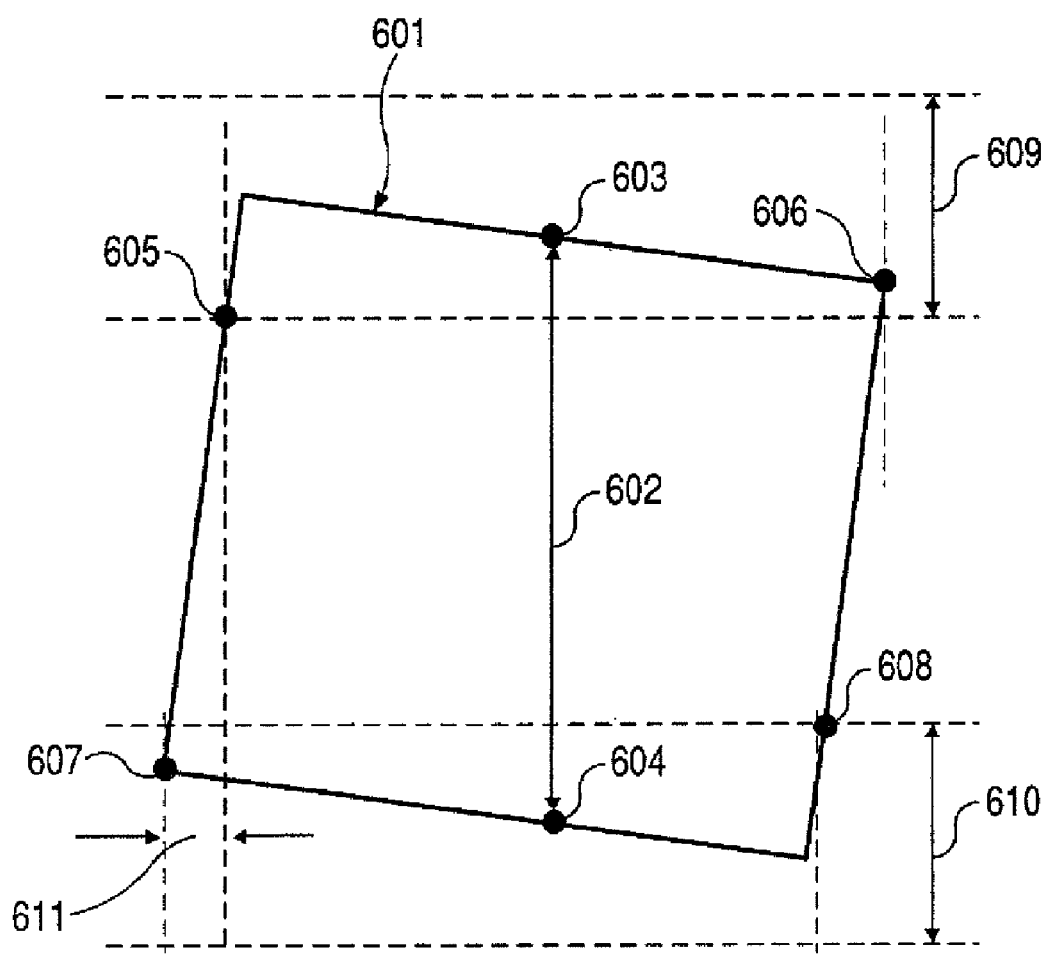
FIG. 6 is a schematic view to schematically show detection positions of an inclined original.

A shift width in the left and right direction (main scanning direction) between the leading end portion of the original 11 and the trailing end portion of the original 11 (referred to as "X." In FIG. 6, the shift width X 611 in the left and right direction) can be calculated from (i) an insertion position of the original 11 (leading end left end pixel 605 in FIG. 6) obtained using the read data of lines the number of which is the necessary minimum number and which contain the leading end portion of the original 11 (left and right detection range (leading end portion) 609 in FIG. 6) and (ii) an insertion position of the original 11 (trailing end left end pixel 607 in FIG. 6) obtained using the read data of lines the number of which is the necessary minimum number and which contain the trailing end portion of the original 11 (left and right detection range (trailing end portion) 610 in FIG. 6). That is, a distance between (i) the leading end left end pixel 605 disposed at the left end position of the original image data in the left and right detection range (leading end portion) 609 of the leading end portion of the original 11 and the trailing end left end pixel 607 disposed at the left end position of original image data in the left and right detection range (trailing end portion) 610 of the trailing end portion of the original is "X."

By referencing to a length of the original 11 (referred to as "Y"; the length Y 602 of the original 11 in FIG. 6) detected by the first calculating module 308 shown in FIG. 3, an inclination angle of the original 11 can be found by the following calculation expression. The image processing module 306 shown in FIG. 3 may execute the rotation correction for the image data using the thus obtained inclination angle. α in the following expression denotes an offset value for arbitrary adjustment considering arbitrary length of the left and right detection range and an error caused by the method for detecting the width of the original executed by the second calculating module 310 shown in FIG. 3 described later.

$$\text{Inclination Angle} = \tan^{-1}((X+\alpha)/Y)$$

Figure 7:
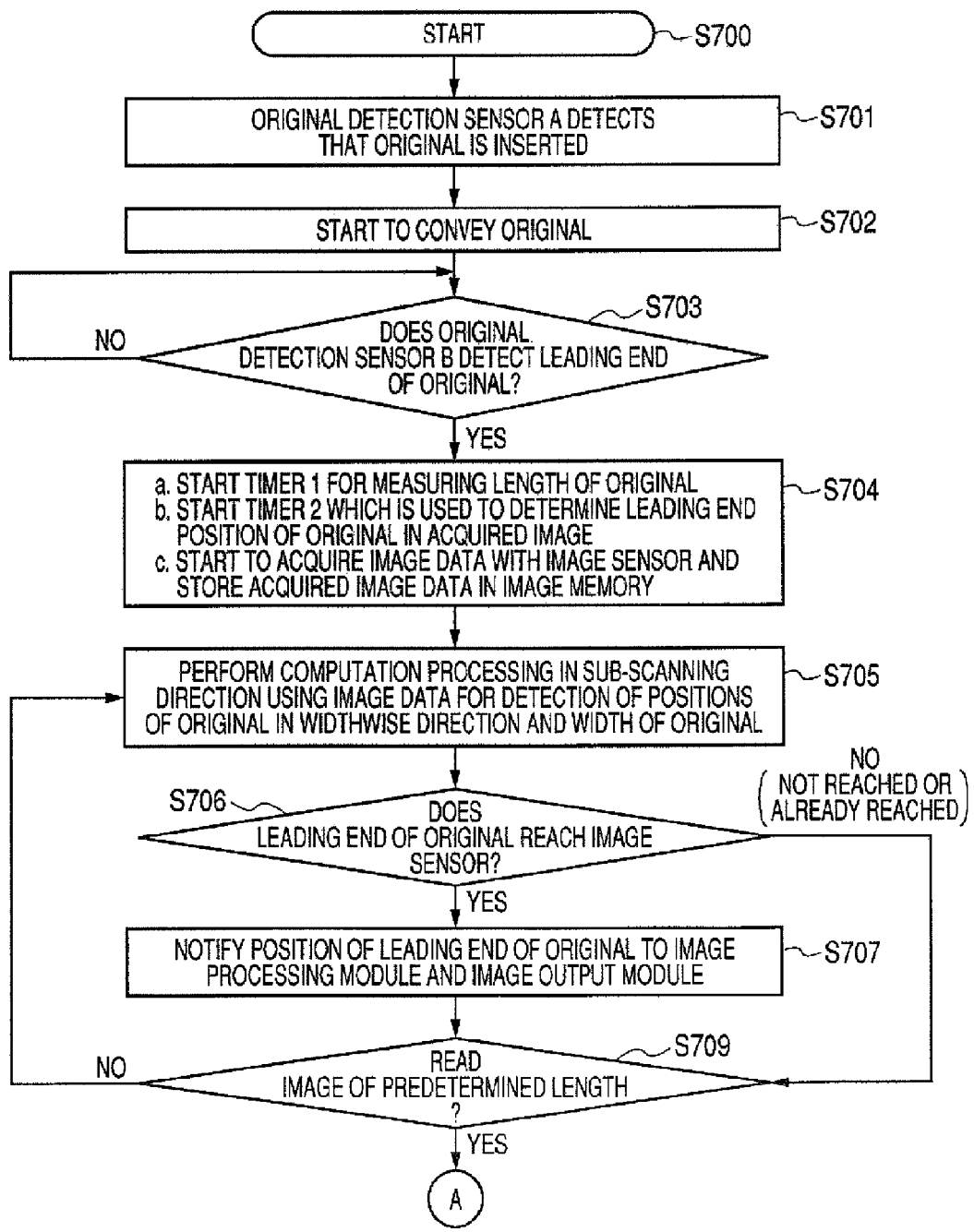
FIG. 7 is a flowchart to show a process example of determining original positions.
Figure 8:
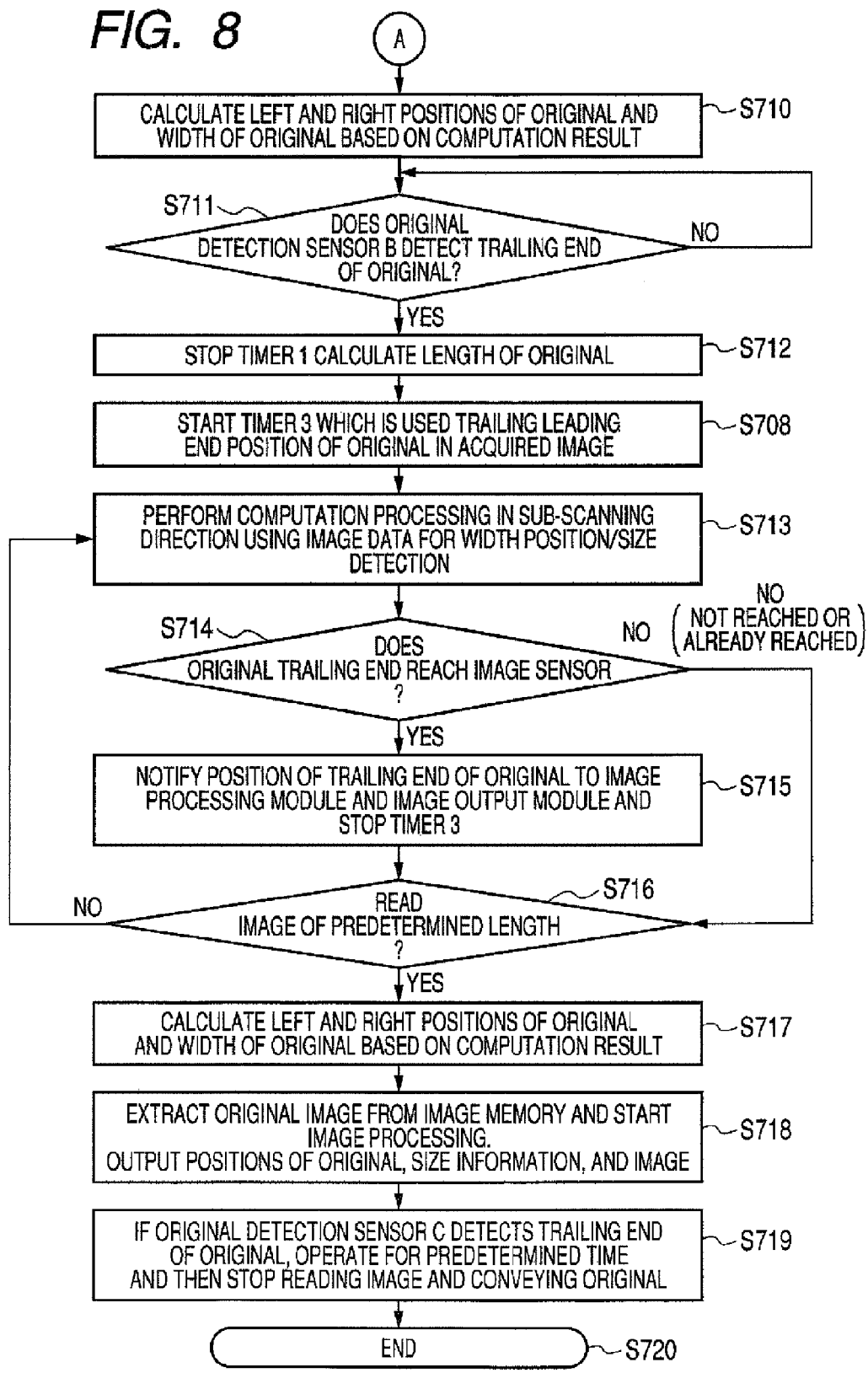
FIG. 8 is a flowchart to show a process example of determining the original positions.

A process example of determining of positions of the will be described with reference to flowcharts shown in FIGS. 7 and 8.

At step S701, the scanner control module 301 detects that an original 11 is inserted, using the original detection sensor 14A.

At step S702, the scanner control module 301 starts to convey the original 11 with the rollers 13A, 13B, 13C and 13D.

At step S703, the scanner control module 301 determines as to whether or not the original detection sensor 14B detects the leading end of the original 11 and waits until the original detection sensor 14B detects the leading end of the original 11.

At step S704, (a) the scanner control module 301 starts a timer 1 for measuring a length of the original 11; (b) the scanner control module 301 starts a timer 2, which is used to determine a leading end position of the original image data in the acquired image data; and (c) the image reading module 302 starts to acquire image data with the image sensor 17, and the image memory 305 stores the acquired image data.

At step S705, the data calculating module 311 performs the computation process (described later) in the sub-scanning direction for detection of positions of the original 11 in the widthwise direction and a width of the original 11.

At step S706, the scanner control module 301 determines as to whether or not the leading end of the original 11 reaches the image sensor 17. Because a distance between the original detection sensor 14B and the image sensor 17 is known in advance and because the scanner control module 301 checks the conveyance speed of the rollers 13A to 13D in real time, the scanner control module 301 can determine as to whether or not the leading end of the original 11 reaches the image sensor 17, based on the timer 2 and the conveyance speed of the rollers 13A to 13D. In other words, the scanner control module 301 can determine when the leading end of the original 11 reaches the image sensor 17. If the leading end reaches the image sensor 17, the process goes to step S707. Otherwise, that is, if the leading end does not reach or has already reached the image sensor 17, the process goes to step S709.

At step S707, the scanner control module 301 notifies to the image processing module 306 and the image output module 307 that the leading end position of the original 11 reaches the image sensor 17.

At step S709, the image reading module 302 determines as to whether or not the image sensor 17 has read an image of a predetermined length based on the timer 2 and the conveyance speed of the rollers 13A to 13D. If the image sensor 17 has read an image of the predetermined length, the scanner control module 301 stops and rests the timer 2 and the process goes to step S710. Otherwise, that is, if the image sensor 17 has not yet read an image of the predetermined length, the process returns to step S705. For example, the predetermined length is equal to or longer than a length of the range 609 (512) in the sub-scanning direction (see FIGS. 5 and 6).

At step S710, the second calculating module 310 calculates the left and right positions of the original 11 and the width of the original 11 based on the computation result at step S705. Specifically, if the original 11 is inserted into the scanner without inclination (skew) as shown in FIG. 5, the second calculating module 310 obtains the left position 504 and the right position 505 of the leading end portion of the original 11, and also obtains a distance between the left and right positions 504, 505 as a width of the leading end portion of the original 11. On the other hand, if the original is inserted with inclination (skew) as shown in FIG. 6, the second calculating module 310 obtains the left position 605 and the right position 606 of the leading end portion of the original 11, and also obtains a distance between the left and right positions 605 and 606 as a length of the leading end portion of the original 11.

In this case, the obtained width of the original 11 is longer than the actual width of the original 11 due to the inclination (skew). The image output module 307 may correct the obtained width of the original 11 based on the rotation angle of the original 11 (which will be obtain in step S718 or later).

At step S711, the scanner control module 301 determines as to whether or not the original detection sensor 14B detects the trailing end of the original 11, and waits until the original detection sensor 14B detects the trailing end of the original 11.

At step S712, the scanner control module 301 stops the timer 1. The first calculating module 308 calculates the length of the original 11 based on the measurement time of the timer 1 and the conveyance speed of the rollers (rollers 13A, 13B, 13C and 13D).

At step S708, for the purpose of detecting a position of the trailing end of the original 11 in the acquired image data, the scanner control module 301 starts a timer 3 for measuring a transit time of the original 11 through the image sensor 17.

At step S713, the data calculating module 311 performs the computation process (described later) in the sub-scanning direction for detection of positions of the image data and a width of the image data.

At step S714, the scanner control module 301 determines based on the timer 3 and the conveyance speed of the rollers 13A to 13D, as to whether or not the trailing end of the original 11 reaches the image sensor 17. If the trailing end reaches the image sensor 17, the process goes to step S715. Otherwise, that is, if the trailing end does not reach or has already reached the image sensor 17, the process goes to step S716.

At step S715, the scanner control module 301 notifies to the image processing module 306 and the image output module 307 that the trailing end position of the original 11 reaches the image sensor 17.

At step S716, the image reading module 302 determines based on the timer 3 and the conveyance speed of the rollers 13A to 13D, as to whether or not the image sensor 17 has read an image of a predetermined length since the original detection sensor 14B detected the trailing end of the original 11 at step S711. If the image sensor 17 has read an image of the predetermined length, the scanner control module 302 stops and rests the time 3, and the process goes to step S717. Otherwise, that is, if the image sensor 17 has not yet read an image of the predetermined length, the process returns to step S713. For example, the predetermined length is equal to or longer than a length of the range 610 (513) in the sub-scanning direction (see FIGS. 5 and 6).

At step S717, the second calculating module 310 calculates the left and right positions of the original 11 and the width of the original 11 based on the computation result at step S713. Specifically, if the original 11 is inserted into the scanner without inclination (skew) as shown in FIG. 5, the second calculating module 310 obtains the left position 509 and the right position 510 of the trailing end portion of the original 11, and also obtains a distance between the left and right positions 509, 510 as a width of the trailing end portion of the original 11. On the other hand, if the original is inserted with inclination (skew) as shown in FIG. 6, the second calculating module 310 obtains the left position 607 and the right position 608 of the trailing end portion of the original 11, and also obtains a distance between the left and right positions 607 and 608 as a length of the trailing end portion of the original 11. In this case, the obtained width of the original 11 is longer than the actual width of the original 11 due to the inclination (skew). The image output module 307 may correct the obtained width of the original 11 based on the rotation angle of the original 11 (which will be obtain in step S718 or later).

At step S718, the image processing module 306 cuts out original image data from the image data stored in the image memory 305 and starts the image processing. Also, the image output module 307 outputs the positions of the original 11, the size information of the original 11 and the processed original image data. The positions of the original 11 and the size information of the original 11 may be used in image processing such as a skew correction process.

At step S719, if the original detection sensor 14C detects the trailing end of the original 11, the scan control module 301 operates for a predetermined time and then stops reading an image and conveying the original 11.

Next, the computation method executed by the data calculating module 311 shown in FIG. 3 and the determination method executed by the second calculating module 310 will be described. The computation method and the determination method calculate a variation amount in density of each reading pixel or density of each group of plural reading pixels in the sub-scanning direction from plural lines containing a line at which an original is read; and detects an end of the original. Four examples are given below based on respective computation methods. However, any computation may be performed if the method calculates the variation amount of the density of each reading pixel in the sub-scanning direction before detecting an end of the original.

<Computation Method 1>

In this method, the calculation memory 312 stores certain data in advance as reference data for each pixel. Whenever read data is input, the data calculating module 311 calculates a difference of each pixel between the input read data and a density of the reference data. Then, the second calculating module 310 retains, for each pixel, the number of times the difference of each pixel exceeds a threshold value A. Upon completion of acquiring the read data for detection, the data calculating module 311 determines that a pixel for which the number of times the difference has exceeded the threshold value A exceeds a threshold value B is a position through which the original 11 passes.

Figure 9:
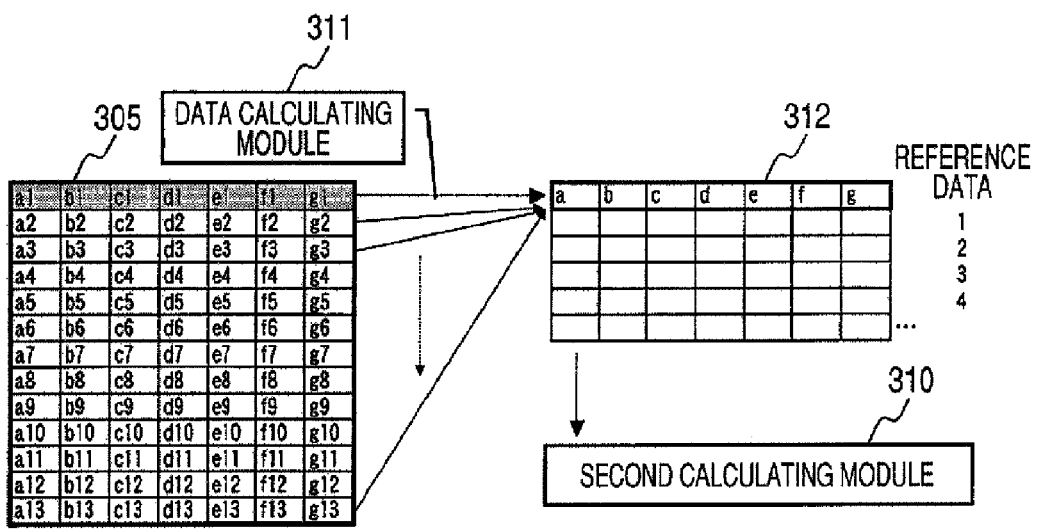
FIG. 9 is a schematic view to schematically show an algorithm of detecting an original width.

The computation method will be described with FIG. 9. The image read by the image reading module 302 is stored in the image memory 305 shown in FIG. 9 as image data subjected to the processes executed by the A/D conversion module 303 and the shading correction module 304. The reference data is stored in the first row of the calculation memory 312. The data calculating module 311 calculates a difference between pixel values in each row of the image memory 305 and the reference data stored in the calculation memory 312. The data calculating module 311 determines as to whether or not the difference of each pixel exceeds the threshold value A, and stores the determination result for each pixel in the second and later rows of the calculation memory 312. The data calculating modules 311 makes this determination until the last row of the image memory 305. The second calculating module 310 counts the number of pixels, which exceed the threshold value A, in each column of the calculation memory 312. The second calculating module 310 determines that a pixel with the number of pixels exceeding the threshold value B is a position where the original 11 passes.

Figure 10:
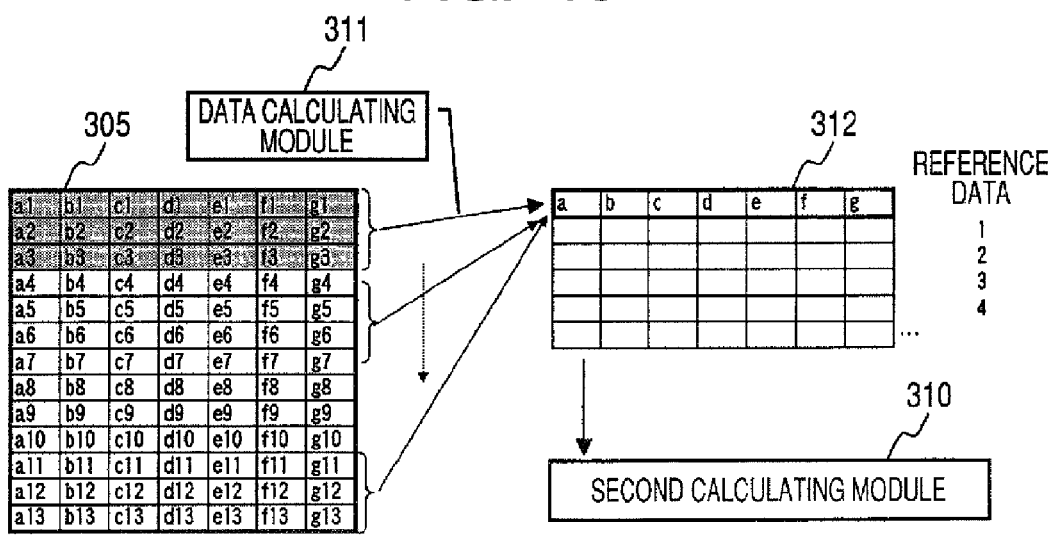
FIG. 10 is a schematic view to schematically show an algorithm of detecting the original width.

The reference data may be read data of a single line (single row) or may be an average value of several lines (several rows). The image data, which are input at any time used to calculate the difference, may be read data of a single line (single row) or may be an average value of several lines (several rows). The threshold values A and B may be set to any desired values. However, for the purpose of detecting without error, the threshold values A and B may be adjusted for each apparatus (for each system) of the exemplary embodiment. FIG. 10 shows the case where the image data contains three lines (three rows). In FIG. 10, the data calculating module 311 uses an average value of three lines (for example, first to third rows, second to fourth rows, third to fifth rows, . . . of the image memory 305) rather than for each line in FIG. 9. Other processes are similar to those shown in FIG. 9.

<Computation Method 2>

The data calculating module 311 calculates a difference of each pixel in density between reading data of a line in question and reading data in a line preceding or following the line in question. Then, the data calculating module 311 retains, for each pixel, number of times the difference exceeds the threshold value A. Each time the data calculating module 311 calculates the difference, the data calculating module 311 shifts the line in question in the sub-scanning direction and repeats the calculating. Upon completion of acquiring read data for detection, the second calculating module 310 determines that a pixel for which the number of times the difference has exceeded the threshold value A exceeds the threshold value B is a position through which the original 11 passes.

The read data of the line in question may be read data of a single line or may be an average value of plural lines. The image data in a line preceding or following the line in question for use in calculating the difference may be read data of a single line or may be an average value of plural lines. The shift amount of the line in question in the sub-scanning direction may be a single line at a time or may be plural lines at a time. Although the threshold values A and B may be set to any desired values, those threshold values A and B may be adjusted for each apparatus (for each system) of the exemplary embodiment so as to detect without any error.

<Computation Method 3>

The data calculating module 311 extracts a maximum density of each pixel and a minimum density of each pixel from all read data, which are input for detection. The second calculating module 311 determines that a pixel having a difference between the maximum density maximum and the minimum value exceeding a threshold value A is a position where the original 11 passes.

Figure 11:
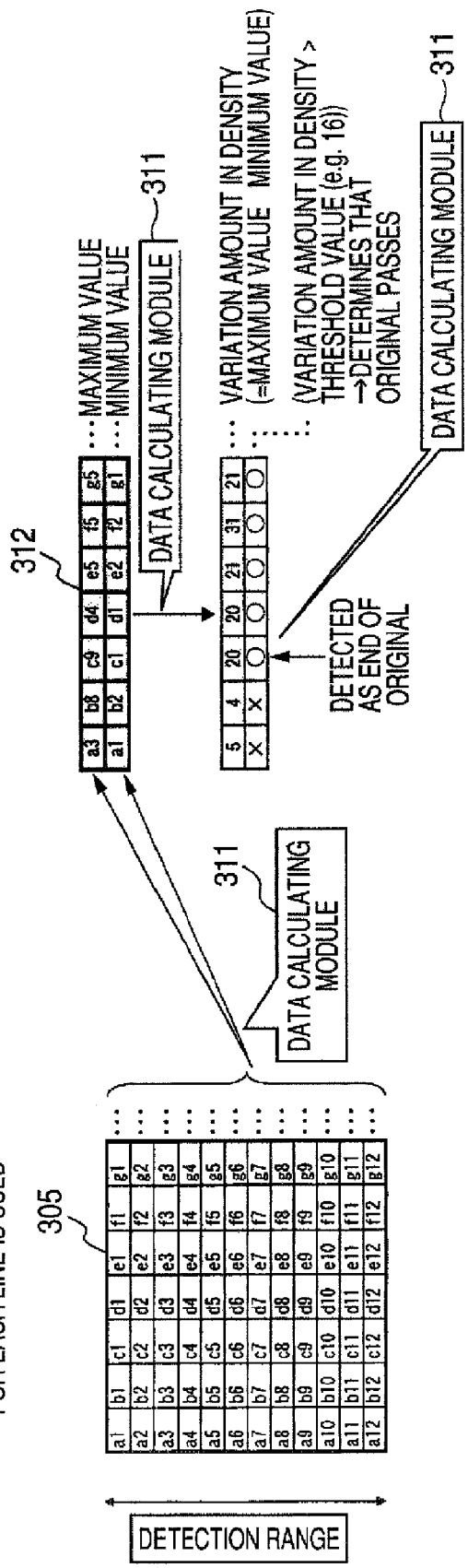
FIG. 11 is a schematic view to schematically show an algorithm of detecting the original width.

The computation method will be described with FIG. 11. The data calculating module 311 extracts the first line from the image data stored in the image memory 305. Then, the data calculating module 311 temporarily stores the extracted first line as a maximum value in the first line of the calculation memory 312 and also temporarily stores the first line as a minimum value in the second line of the calculation memory 312. Then, the data calculating module 311 makes a comparison between each pixel in the second line of the image memory 305 and the maximum value in the first line of the calculation memory 312. If the pixel of the image data in the image memory 305 is larger than the maximum value in the first line of the calculation memory 312, the data calculating module 311 replaces the value in the first line of the calculation memory 312 with the pixel of the image data in the image memory 305. Likewise, the data calculating module 311 makes a comparison between each pixel in the second line of the image memory 305 and the minimum value in the second line of the calculation memory 312. If the pixel of the image data in the image memory 305 is smaller than the minimum value in the second line of the calculation memory 312, the data calculating module 311 replaces the value in the second line of the calculation memory 312 with the pixel of the image data in the image memory 305. This process is applied to all lines stored in the image memory 305. Then, the data calculating module 311 obtains a variation value in density (=maximum value−minimum value) from the maximum value and the minimum value, which are stored as the result in the calculation memory 312. The data calculating module 311 determines that a pixel having the variation mount in density exceeding the threshold value A (in FIG. 11, the threshold value A=16) is a position through which the original 11 passes. The data calculating module 311 determines as to whether or not the variation amount in density exceeds the threshold value A in order from the left end of the data stored in the calculation memory 312, and detects the first pixel exceeding the threshold value A as the left end of the original 11. Likewise, the data calculating module 311 determines as to whether or not the variation amount in density exceeds the threshold value A in order from the right end of the data stored in the calculation memory 312, and detects the first pixel exceeding the threshold value A as the right end of the original 11.

Figure 12:
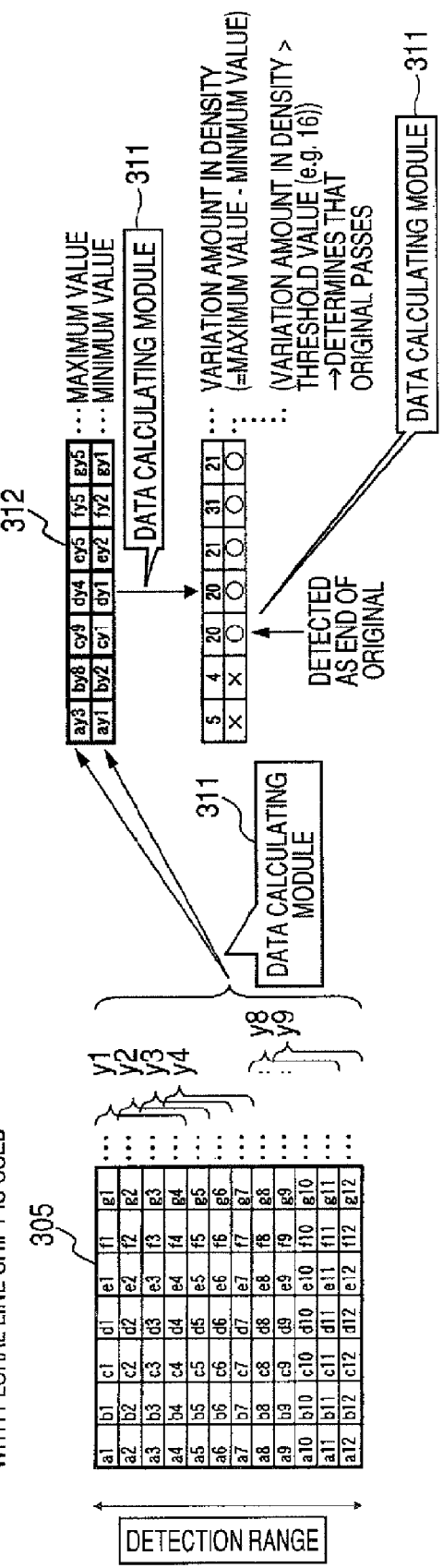
FIG. 12 is a schematic view to schematically show an algorithm of detecting the original width.
Figure 13:
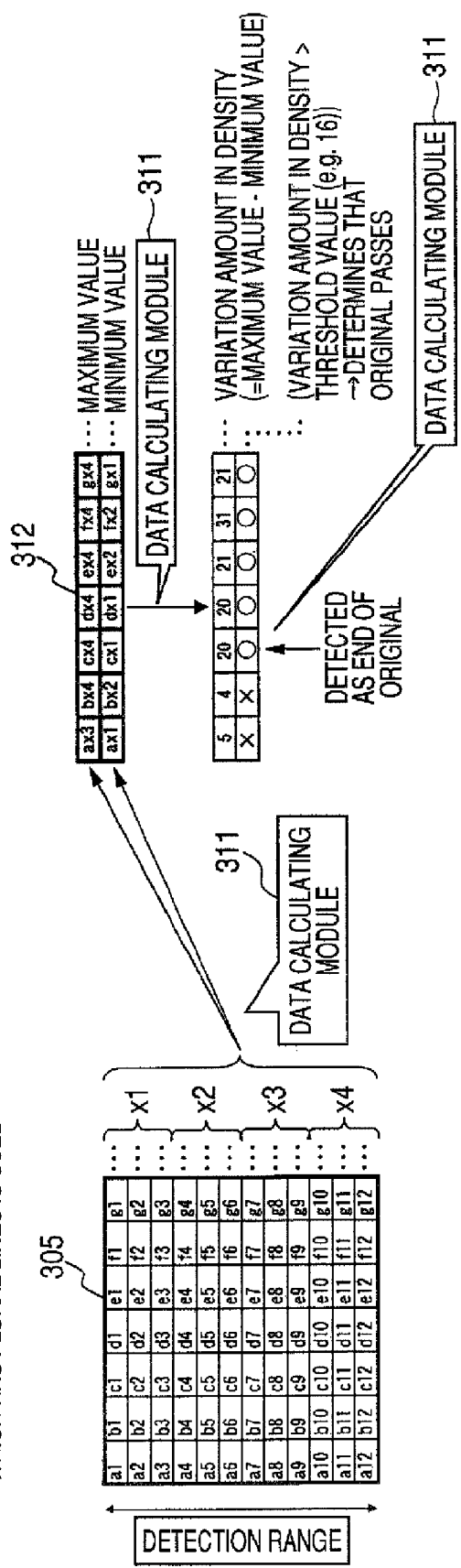
FIG. 13 is a schematic view to schematically show an algorithm of detecting the original width.

The image data input for detection may be image data of a single line or may be an average value of plural lines. Although the threshold value A may be set to any desired value, the threshold value A may be adjusted for each apparatus (for each system) of the exemplary embodiment so as to detect without any error. In FIG. 11, the data calculating module 311 extracts image data from the image memory 305 one line by one line and acquire the maximum density and the minimum density for each pixel. Alternatively, in FIG. 12, the data calculating module 311 obtains average values of pixels of four lines of image data stored in the image memory 305 and acquire the maximum density and the minimum density. The data calculating module 311 shits the four lines by one line at a time and then extracts image data of the next four lines (specifically, first to fourth rows, second to fifth rows, third to sixth rows, . . . ). Further alternatively, in FIG. 13, the data calculating module 311 obtains average values of pixels of three lines of image data stored in the image memory 305 and acquires the maximum density and the minimum density. The data calculating module 311 shifts the three lines by three lines at a time and extracts image data of the next three lines (specifically, first to third rows, fourth to sixth rows, seventh to ninth rows, . . . )

<Computation Method 4>

The data calculating module 311 extracts appearance frequency of a density of each pixel, which frequently appears, from all read data input for detection. The second calculating module 308 determines that a pixel having appearance frequency of a density, which frequently appears, falling below a threshold value A is a position where the original 11 passes.

All read data input for detection may be read data of a single line or may be an average value of plural lines. Although the threshold value A may be set to any desired value, the threshold value A may be adjusted for each apparatus (for each system) of the exemplary embodiment so as to detect without any error.

The exemplary embodiment shows detecting positions of an original (end portions of the original) using the variation amount in density of each pixel. Alternatively, a variation amount in density of a group of adjacent pixels rather than may be used. In this case, an average of plural pixels may be used.

In the exemplary embodiment, the processing is applied to all the pixels in one line, but may be applied to pixels at predetermined intervals. In this case, the number of pixels to which the processing is applied is decreased, so that the processing can be speeded up.

In the exemplary embodiment, the scanner is taken as an example, but the exemplary embodiment can also be applied to a copier, a facsimile, a multifunction processing machine (also called a multifunction copier, having functions of a scanner, a printer, a copier, a facsimile, etc.,), image processing software, etc.

The exemplary embodiment adopts the original insertion mode, but can also be applied to a CVT mode for reading stacked originals at high speed (a platen plate and an image sensor are fixed).

The described program can also be stored on a record medium, in which case it can also be grasped as the following invention, for example:

A record medium readable by an image processing apparatus, recording an image processing program for causing an image processing apparatus to implement:

an image data input function of inputting image data containing original image data provided by reading an original;

a density variation detection function of detecting density variation from the image data input through the image data input unit; and a position size detection function of detecting the position or the size of the original image data in the image data using the density variation detected by the density variation detection unit.

The expression "record medium readable by an image processing apparatus, recording a program" is used to mean a record medium that can be read by an image processing apparatus recording a program, used to install and execute a program, to distribute a program, etc.

The record media include "DVD-R, DVD-RW, DVD-RAM, etc.," of digital versatile disk (DVD) and standard laid down in DVD Forum, "DVD+R, DVD+RW, etc.," of standard laid down in DVD+RW, read-only memory (CD-ROM), CD recordable (CD-R), CD rewritable (CD-RW), etc., of compact disk (CD), magneto-optical disk, flexible disk (FD), magnetic tape, hard disk, read-only memory (ROM), electrically erasable and programmable read-only memory (EEPROM), flash memory, random access memory (RAM), etc., for example.

The described program or a part thereof can be recorded in any of the described record media for retention, distribution, etc. The described program or a part thereof can also be transmitted by communications using a transmission medium such as a wired network used with a local area network, a metropolitan area network (MAN), a wide area network (WAN), the Internet, an intranet, an extranet, etc., or a wireless communication network or a combination thereof, etc., for example, and can also be carried over a carrier wave.

Further, the described program may be a part of another program or may be recorded in a record medium together with a different program.

What is claimed is:

1. An image processing apparatus comprising:
   an image data input unit that scans an original document in a main scanning direction and generates image data of the original document based on the scanned original document, the original document having a leading edge, a trailing edge, and a side edge disposed between the leading edge and the trailing edge;
   a density variation detection unit that detects density variation at the leading edge, the trailing edge, and the side edge of the original document in the image data generated by the image data input unit in a sub-scanning direction of the image data that is substantially perpendicular to the main scanning direction; and
   a position/size detection unit that detects a first position of a leading edge side end pixel at an outermost position of the side edge in a leading end portion of the image data that includes data scanned before the leading edge of the original document and a second position of a trailing edge side end pixel at an outermost position of the side edge in a trailing end portion of the image data that includes data scanned after the trailing edge of the original document based on the density variation detected by the density variation detection unit; and an image processing unit that calculates an inclination of the original document from the first position and the second position detected by the position/size detection unit and corrects the inclination.

2. The apparatus according to claim 1, wherein the image data input unit inputs the image data by conveying the original.

3. The apparatus according to claim 1, wherein a sensor for inputting the image data is fixed in the image data input unit.

4. The apparatus according to claim 1, wherein the density variation detection unit detects a variation amount in density of each pixel in the sub-scanning direction, and if the variation amount in density of a pixel detected by the density variation detection unit is equal to or larger than a threshold value, the position/size detection unit detects the pixel whose the variation amount in density is equal or larger than the threshold value as a position of the original document.

5. The apparatus according to claim 1, wherein the density variation detection unit detects a variation amount in density of each pixel based on image data of a plurality of lines in the main scanning direction.

6. The apparatus according to claim 5, wherein the density variation detection unit detects a variation amount in density of each pixel with starting from pixels located at both ends in the main scanning direction toward inner pixels.

7. The apparatus according to claim 1, wherein the position/size detection unit detects a size of the original document from the detected first position and second position of the original document.

8. The apparatus according to claim 1, wherein the density variation detection unit detects the density variation by making a comparison between previously stored reference data and the image data.

9. An image reading apparatus comprising:

a reading unit comprising a plurality of pixels arranged along a main scanning direction, the pixels that read an original to acquire image data containing original image data;

a density variation detection unit that detects density variation of each pixel group in a sub-scanning direction based on the acquired image data, wherein each pixel group includes at least one pixel and the main scanning direction is substantially perpendicular to the sub-scanning direction;

a first position detection unit that detects a pair of positions of both ends, in the main scanning direction, of the original image data in the image data based on the density variation detected by the density variation detection unit;

an output unit that outputs the detected pair of positions to an external device;

a second position detection unit that detects a pair of positions of both ends of the original image data in the sub-scanning direction; and an image processing unit that calculates a skew amount of the original image data with respect to the image data based on (i) the at least two pairs of positions of the both ends of the original image data in the main scanning direction and (ii) the pair of positions of the both ends in the sub-scanning direction, and corrects the original image data based on the calculated skew amount, wherein:

the first position detection unit detects at least two pairs of positions of both ends, in the main scanning direction, of the original image data based on the detected density variation, one of the pairs of positions is in a vicinity of a leading end of the original image data in the main-scanning direction, another of the pairs of positions is in a vicinity of a trailing end of the original image data in the main-scanning direction, the output units outputs the detected pairs of the positions, and the output unit outputs the corrected original image data to the external device.

* * * * *